(12) United States Patent
Katefidis (10) Patent No.: US 10,928,134 B2
(45) Date of Patent: Feb. 23, 2021

(54) BURNER UNIT AND DEVICE FOR THE TEMPERATURE CONTROL OF OBJECTS

(71) Applicant: EISENMANN SE, Böblingen (DE)

(72) Inventor: Apostolos Katefidis, Gärtringen (DE)

(73) Assignee: EISENMANN SE, Böblingen (DE)

( * ) Notice: Subject to any disclaimer, the term of this patent is extended or adjusted under 35 U.S.C. 154(b) by 200 days.

(21) Appl. No.: 15/999,247

(22) PCT Filed: Feb. 13, 2017

(86) PCT No.: PCT/EP2017/053183
§ 371 (c)(1),
(2) Date: Aug. 17, 2018

(87) PCT Pub. No.: WO2017/140631
PCT Pub. Date: Aug. 24, 2017

(65) Prior Publication Data
US 2019/0093948 A1    Mar. 28, 2019

(30) Foreign Application Priority Data

Feb. 17, 2016 (DE) ..................... 10 2016 001 893.3

(51) Int. Cl.
*F26B 23/02* (2006.01)
*F23C 7/00* (2006.01)
(Continued)

(52) U.S. Cl.
CPC ............ *F26B 23/022* (2013.01); *F23C 7/004* (2013.01); *F23C 9/006* (2013.01); *F23G 7/066* (2013.01);
(Continued)

(58) Field of Classification Search
CPC ........ F23C 9/006; F23C 9/00; F23C 2202/30; F23C 2900/09002; F23D 14/20; F23D 14/62; F23L 9/00
See application file for complete search history.

(56) References Cited

U.S. PATENT DOCUMENTS 1,322,999 A * 11/1919 Bester ...................... F23N 5/02
431/84
2,110,209 A * 3/1938 Engels .................. F26B 21/002
431/115
(Continued)

FOREIGN PATENT DOCUMENTS

DE    19 10 115    9/1970
DE    25 38 413    3/1977
(Continued)

*Primary Examiner* — Jorge A Pereiro
(74) *Attorney, Agent, or Firm* — Schroeder Intellectual Property Law Group, LLC (57) ABSTRACT

Flue gases are produced in a combustion chamber of a burner unit, in particular for the combustion of exhaust air. Combustion gas can be supplied to a gas burner via a combustion gas line and feed air, in particular exhaust air that can be used as feed air, is supplied to said burner via a feed air line. The feed air is divided into primary air and secondary air by a device. The primary air is mixed with the combustion gas, in a mixing zone, to form a primary air/combustion gas mixture, said primary air/combustion gas mixture being supplied to the combustion chamber. A flue gas re-circulation system comprises a through-flow chamber which is connected to the combustion chamber and in which the secondary air is mixed with the flue gases occurring in the combustion chamber to form a secondary air/flue-gas mixture. The secondary air/flue-gas mixture is supplied to the primary air/combustion gas mixture in the combustion chamber by means of a device. At least one internal cylindrical surface of the through-flow chamber forms a Coanda
(Continued)

profile in the direction of flow. A device for the temperature control of objects, in particular for drying painted vehicle bodies, comprises a temperature-control tunnel that is accommodated in a housing and that defines at least one tunnel section comprising at least one air outlet and at least one air inlet. A heating assembly, in which a hot primary gas can be generated by means of a burner unit of this type, is associated with the tunnel section.

7 Claims, 5 Drawing Sheets (51) Int. Cl.
*F23C 9/00* (2006.01)
*F23G 7/06* (2006.01)
*F26B 3/04* (2006.01)
*F26B 15/12* (2006.01)
*F26B 21/02* (2006.01)

(52) U.S. Cl.
CPC .............. *F26B 3/04* (2013.01); *F26B 15/12* (2013.01); *F26B 21/02* (2013.01); *F26B 23/02* (2013.01); *F23C 2203/30* (2013.01); *F23C 2900/09002* (2013.01); *F23C 2900/99001* (2013.01); *F26B 2210/12* (2013.01); *Y02E 20/34* (2013.01)

(56) References Cited

U.S. PATENT DOCUMENTS

| | | | |
|---|---|---|---|
| 2,391,195 A | 3/1943 | Ross et al. | |
| 2,472,293 A | 9/1945 | Groven | |
| 3,319,692 A * | 5/1967 | Reba | F23C 9/00 431/116 |
| 3,817,685 A * | 6/1974 | Joannes | F23C 9/006 431/116 |
| 3,942,264 A | 3/1976 | Zenkner | |
| 4,050,238 A * | 9/1977 | Holzapfel | F23R 3/10 60/39.23 |
| 4,083,674 A * | 4/1978 | Holzapfel | F23R 3/30 431/11 |
| 4,130,388 A * | 12/1978 | Flanagan | F23C 7/02 431/10 |
| 4,160,526 A | 7/1979 | Flanagan | |
| 4,160,640 A * | 7/1979 | Maev | F23R 3/14 431/183 |
| 4,199,934 A * | 4/1980 | Meyer | F23R 3/02 60/39.23 |
| 4,255,132 A | 3/1981 | Carthew | |
| 4,416,068 A | 11/1983 | Nilsson et al. | |
| 4,480,986 A * | 11/1984 | Nelson | F23N 5/102 431/37 |
| 4,635,381 A | 1/1987 | Hubbert | |
| 4,656,758 A | 4/1987 | Nakayama | |
| 4,670,994 A | 6/1987 | Takata et al. | |
| 4,688,496 A * | 8/1987 | Schreter | F23D 1/02 110/264 |
| 4,725,223 A * | 2/1988 | Coppin | F23G 7/065 422/173 |
| 4,761,894 A | 8/1988 | Hamasaki et al. | |
| 4,771,552 A | 9/1988 | Morioka | |
| 4,845,940 A * | 7/1989 | Beer | F23C 6/045 60/732 |
| 4,942,676 A * | 7/1990 | Wimberger | F26B 13/104 34/558 |
| 5,062,789 A * | 11/1991 | Gitman | F23C 9/006 239/129 |
| 5,113,600 A | 5/1992 | Telchuk | |
| 5,207,008 A * | 5/1993 | Wimberger | F26B 13/104 34/419 |
| 5,216,885 A * | 6/1993 | Taniguchi | F01K 23/10 60/737 |
| 5,263,265 A | 11/1993 | Melgaard | |
| 5,346,391 A * | 9/1994 | Fullemann | F23C 9/006 431/116 |
| 5,423,674 A * | 6/1995 | Knopfel | F23C 7/002 431/115 |
| 5,568,692 A | 10/1996 | Crompton et al. | |
| 5,657,555 A | 8/1997 | Milojevic et al. | |
| 5,661,912 A | 9/1997 | Bhatnagar et al. | |
| 5,681,159 A * | 10/1997 | Benedek | F23C 7/00 126/115 |
| 5,689,899 A | 11/1997 | Szenker et al. | |
| 5,813,848 A * | 9/1998 | Loqvist | F23C 7/06 431/116 |
| 5,868,562 A | 2/1999 | Watanabe et al. | |
| 6,071,115 A * | 6/2000 | Carbone | F23C 7/00 431/10 |
| 6,383,462 B1 | 5/2002 | Lang | |
| 6,524,098 B1 * | 2/2003 | Tsirulnikov | F23C 7/004 239/404 |
| 6,898,868 B2 | 5/2005 | Vermeulen | |
| 7,175,423 B1 * | 2/2007 | Pisano | F23C 6/045 431/10 |
| 7,360,534 B2 | 4/2008 | Krupp | |
| 8,519,307 B2 | 8/2013 | Schumacher et al. | |
| 8,756,827 B1 | 6/2014 | Calabro et al. | |
| 8,826,565 B2 | 9/2014 | Hahn et al. | |
| 8,832,964 B2 | 9/2014 | Foxen | |
| 8,920,159 B2 * | 12/2014 | Taylor | F23C 9/00 431/187 |
| 9,204,395 B2 | 12/2015 | Li et al. | |
| 9,410,741 B2 | 8/2016 | Katefidis | |
| 2003/0054303 A1 * | 3/2003 | Rabovitser | F23C 6/04 431/9 |
| 2003/0074885 A1 * | 4/2003 | Rokke | F23R 3/286 60/248 |
| 2005/0053877 A1 * | 3/2005 | Feese | F23C 6/045 431/10 |
| 2005/0241319 A1 * | 11/2005 | Graves | F23D 11/107 60/776 |
| 2010/0236500 A1 * | 9/2010 | Douglas | F23C 9/003 122/22 |
| 2011/0023314 A1 | 2/2011 | Schwerer et al. | |
| 2013/0098278 A1 * | 4/2013 | Wang | F23D 1/00 110/265 |
| 2014/0202365 A1 * | 7/2014 | Sturgeon | F23C 9/003 110/347 |
| 2014/0230701 A1 * | 8/2014 | Cheng | F23B 5/02 110/207 |
| 2014/0352169 A1 * | 12/2014 | Katefidis | F26B 15/10 34/666 |
| 2015/0121720 A1 | 5/2015 | Wieland et al. | |

FOREIGN PATENT DOCUMENTS

| | | |
|---|---|---|
| DE | 28 12 960 | 10/1978 |
| DE | 37 17 320 | 7/1988 |
| DE | 92 13 737 | 1/1993 |
| DE | 42 28 454 | 3/1994 |
| DE | 198 50 958 | 5/2000 |
| DE | 10 2006 058 696 | 8/2008 |
| DE | 10 2008 012 792 | 9/2009 |
| DE | 10 2008 026 317 | 12/2009 |
| DE | 10 2010 006 550 | 8/2011 |
| DE | 10 2011 119 436 | 5/2013 |
| DE | 10 2012 207 312 | 11/2013 |
| EP | 0 809 070 | 11/1997 |
| EP | 2 071 260 | 6/2009 |
| EP | 2 295 909 | 3/2011 |
| WO | 2008/017345 | 2/2008 |
| WO | 2013/164285 | 11/2013 |
| WO | 2014/112757 | 7/2014 |

* cited by examiner

BURNER UNIT AND DEVICE FOR THE TEMPERATURE CONTROL OF OBJECTS

RELATED APPLICATIONS

This application is a national phase of International Patent Application No. PCT/EP2017/053183 filed Feb. 13, 2017, which claims priority to German Patent Application No. 10 2016 001 893.3 filed Feb. 17, 2016, the contents of both of which are incorporated herein by reference.

FIELD OF THE INVENTION

The invention relates to a burner unit, especially for combusting exhaust air, with
a) a combustion chamber, in which flue gases are produced;
b) a gas burner, to which is fed combustible gas via a combustible gas line and burner air, especially exhaust air serving as burner air, via a burner air line;
c) a device, by means of which the burner air is divided into primary air and secondary air;
d) a mixing zone, in which the primary air is mixed with the combustible gas, forming a primary air/combustible gas mixture, wherein the primary air/combustible gas mixture is fed to the combustion chamber;
e) a flue gas recirculation arrangement, which comprises a throughflow chamber which is connected to the combustion chamber, and in which the secondary air is mixed with flue gases which are produced in the combustion chamber, forming a secondary air/flue gas mixture;
f) a device, by means of which the secondary air/flue gas mixture is added to the primary air/combustible gas mixture in the combustion chamber.

The invention also relates to a device for the temperature control of objects, especially for drying coated vehicle bodies, with
a) a temperature control tunnel, which is accommodated in a housing and defines at least one tunnel section which comprises at least one air outlet and at least one air inlet wherein
b) a heater unit is associated with the tunnel section, in which heater unit a hot primary gas can be produced by means of a burner unit.

BACKGROUND OF THE INVENTION

The invention is described below based on the example of vehicle bodies as objects, but the invention also relates to devices for other objects which have to be temperature controlled in a production process. When "temperature control" is referred to in the present case, then the bringing about of a specific temperature of the object, which initially this does not yet have, is meant by this. It can be the case of a temperature increase or a temperature reduction. Understood by a "temperature controlled air" is such which has the temperature required for the temperature control of the object.

A case of temperature control, specifically the heating, of vehicle bodies which is frequent in the automobile industry is the process of drying wet vehicle bodies or drying the coating of a vehicle body, whether it now be a lacquer or an adhesive or the like in this case. Correspondingly, wet objects other than vehicle bodies or the coating of other objects can also be dried. The following description of the invention is carried out in detail based on the example of such a drier for vehicle bodies.

When in the present case "drying" is spoken of, then meant by this are all processes in which the coating of the vehicle body, especially a lacquer, can be hardened, whether this may now be by the expulsion of solvents or by cross-linking of the coating substance.

Devices of the type referred to in the introduction, known from the market, are used for the drying of freshly lacquered vehicle bodes and are heated inter alia by air being drawn from tunnel sections which are short compared with the overall length of the drying tunnel, by being heated in a heater unit by means of a heat exchanger and by being fed again in a cycle to the corresponding tunnel section.

In the case of drying freshly lacquered vehicle bodies, the air which is extracted from the tunnel section is laden principally with solvent which is released during the drying process. Coating components which are released during the drying of the vehicle body are also found in this air; for the sake of simplicity, only exhaust air is therefore largely referred to in the following text.

The burner air which is required for operating the burner unit is extracted in the case of a first type of known devices from the environment via a separate compressing blower. Therefore, the burner air has to be heated from the ambient temperature to the burner temperature and is extracted from the environment as clean air which is purified during its use and if necessary can be processed before return to the environment.

In the case of a second type of known devices, provision is made for a burner supply device by means of which exhaust air from the tunnel section can be fed to the burner unit of the heater unit as burner air flow for producing the primary gas for the burner unit.

Regardless of whether such a burner unit is used in a device for the temperature control of objects or not, it is desirable in all cases that the burner unit operates with good emissions values and particularly with the lowest possible values of CO and nitrogen oxide (NOx). This is achieved in the case of known burner units of the type referred to in the introduction especially by means the flue gas recirculation arrangement.

SUMMARY OF THE INVENTION

It is now the object of the invention to provide a burner unit and a device of the type referred to in the introduction, in which particularly good emissions values are achieved.

This object is achieved in the case of a burner unit of the type referred to in the introduction by
g) at least one inner generated surface of the throughflow chamber forming a Coanda profile in the flow direction.

As a result of the Coanda effect, there are high flow velocities and consequently an effective negative pressure at the inlet of the throughflow chamber so that the flue gas in turn flows into the throughflow chamber, and through this, at high velocity. As a result of these increased flow velocities, the overall effectiveness of the burner unit is improved.

In order to maintain an effective intermixing of the flows in the combustion chamber, it is favorable if the throughflow chamber is designed as an annulus which encompasses a core region of the mixing zone of the combustion chamber, wherein the primary air is mixed with the combustible gas in the core region. Therefore, the intermixing of primary air/combustible gas and of secondary air/flue gas is carried out radially next to each other in chambers which are separated from each other. The two mixtures are brought together only after this, wherein they flow at high velocities.

It is constructionally favorable if the device by means of which the burner air is divided into primary air and secondary air is formed by the radially inner annular wall of the annulus.

In order to increase the flow velocity of the resulting secondary air/flue gas mixture again, it is favorable if the annulus forms a Venturi-annular nozzle, wherein the device by means of which the secondary air/flue gas mixture is added to the primary air/combustible gas mixture in the combustion chamber comprises this Venturi nozzle.

It is particularly advantageous if provision is made for a swirler device by means of which primary air can be made to swirl before entry into the core region and/or by means of which secondary air can be made to swirl before entry into the annulus. If the primary air or the secondary air has a swirl, the intermixing with the combustible gas or the flue gas is carried out particularly effectively.

The swirler device is preferably designed as a vane ring.

It is favorable in this case if the vane ring connects the burner air line to the annulus and to the core region of the mixing zone. In other words, the vane ring is fitted in this case in an overlapping manner in front of the partition between the core region of the mixing zone and the annulus.

The aforementioned object is achieved in the case of the device by the burner unit being a burner unit with some or all of the aforementioned features.

BRIEF DESCRIPTION OF THE DRAWINGS

Exemplary embodiments of the invention are explained in more detail below with reference to the drawings. In these drawings

DETAILED DESCRIPTION OF THE INVENTION

Figure 1:
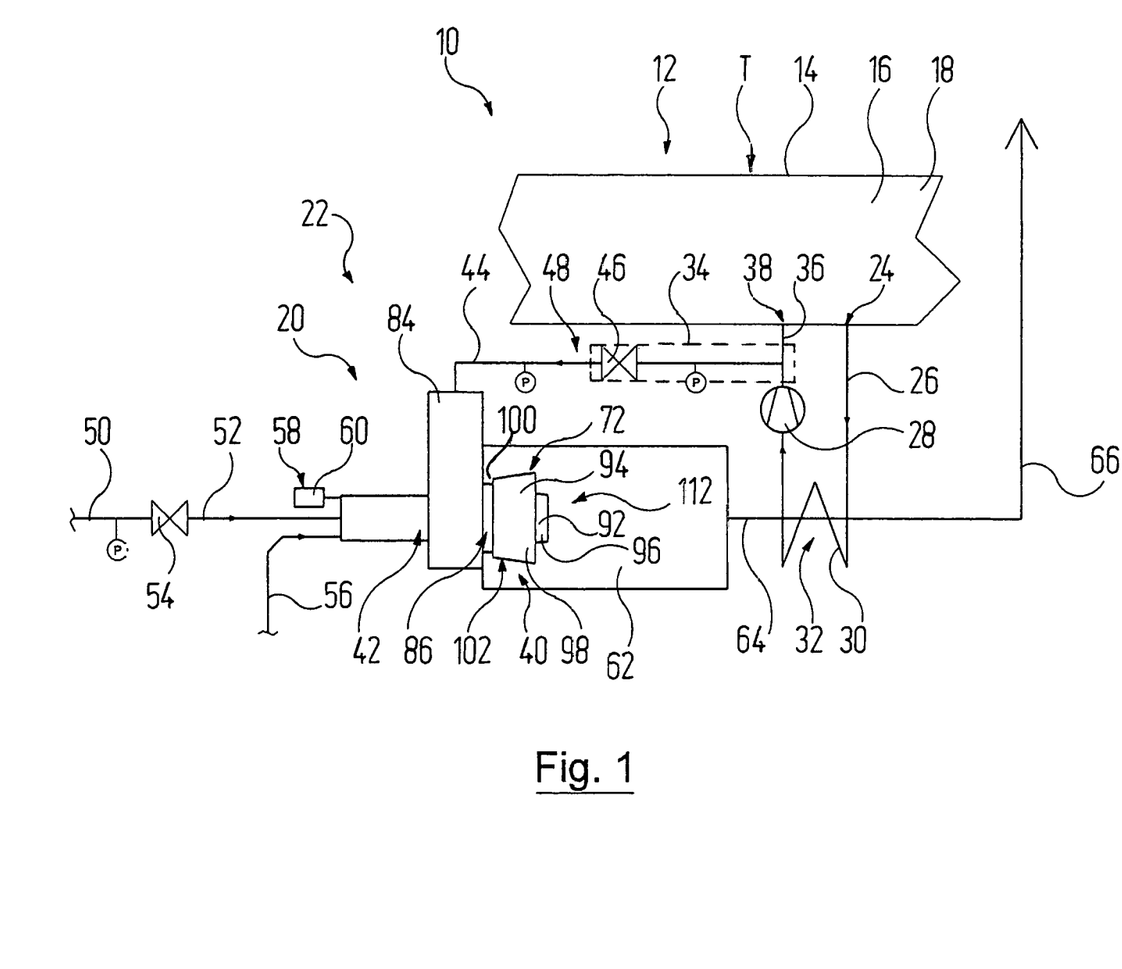
FIG. 1 shows a schematic representation of a drier with a heater unit.

In FIG. 1, the designation 10 identifies a device for the temperature control of objects, which device is illustrated in a greatly schematized manner as a drier 12. The drier 12 comprises a thermally insulated housing 14 in which is accommodated a drying tunnel 18 as a temperature control tunnel 16 through which objects, especially vehicle bodies, not shown separately, can be transported in a continuous pass. To this end, the drier 12 comprises a basically known transporting system for the objects or for the vehicle bodies, which transporting system is not shown separately either for the sake of clarity.

Heated air is fed to the drying tunnel 18 in order to dry the objects or a coating which is applied to these. When in the present case "drying" is referred to, then meant by this are all processes in which the coating of the objects, especially a lacquer, can be hardened, whether this now be by expulsion of solvents or by cross-linking of the coating substance.

The temperature which is required for the drying is maintained in the drying tunnel 18 by means of at least one heater unit 20. FIG. 1 shows only a single heater unit 20; in practice, a plurality of heater units 20 of the same construction are arranged along the drying tunnel 18, which heater units are associated in each case with a section of the drying tunnel 18 but which are not constructionally separated from each other. The section with which is associated the depicted heater unit 20 is designated T. The heater units 20 are arranged as compact gas burner units along the drying tunnel 18 and in this way form a burner system 22.

Tunnel air is fed to the heater unit 20 through an air outlet 24 of the associated tunnel section T. The air outlet 24 is connected to a useful air line 26 in which a feed blower 28 is arranged.

One section of the useful air line 26 forms a coil 30 of a heat exchanger 32. After this, the useful air line 26 leads to a splitter device 34 which divides the useful air flow coming from the useful air line 26 into a circulating air flow and an exhaust air flow after the useful air has passed through the heat exchanger coil 30.

The circulating air is blown through an air inlet 38, which is connected to the air inlet line 36, into the associated tunnel section T of the drying tunnel 18 again. The exhaust air serves as burner air for a burner unit 40 with a gas burner 42 to which is fed, via a burner air line 44, the exhaust air as burner air flow.

The proportions of the useful air flow which are conducted again as circulating air into the drying tunnel 18 and which are conducted as burner air to the gas burner 42 can be adjusted via a valve 46 of the splitter device 34. The proportion of the tunnel air which is branched off as burner air lies in the order of magnitude of approximately 1% of the tunnel air which is conducted as circulating air and which flows from the tunnel section T of the associated heater unit 20 through the air outlet 24 into the useful air line 26.

The splitter device 34 and the burner air line 44 therefore form a burner supply device 48 via which exhaust air from the associated tunnel section T is fed to the gas burner 42 as burner air flow for producing a hot primary gas.

The required combustible gas is fed to the gas burner 42 from a combustible gas source 50 via a combustible gas line 52. The volumetric flow of the combustible gas can be adjusted by means of a valve 54. Auxiliary air can also additionally be fed in a basically known manner to the gas burner 42 via an auxiliary air line 56; this auxiliary air can serve in a basically known manner as ignition air on the one hand, when the gas burner 42 is run up, or on the other hand can be used as cooling air during running operation of the gas burner 42. An existing auxiliary air source and an adjustment valve for this are not shown separately.

The flame of the gas burner 42 is monitored also in a basically known manner by a monitoring device 58 which in the case of the present exemplary embodiment operates with a sensor 60 which can be designed as an IR sensor or UV sensor or as an ionization sensor.

In the gas burner 42 the solvents in the exhaust air are as far as possible combusted, wherein hot flue gases are produced in a combustion chamber 62 of the burner unit 40 as primary gas. These hot flue gases are conducted via a line 64 to the heat exchanger 32 where they heat the useful air, containing solvents, which flows through its heat exchanger coil 30, a proportion of which useful air, as burner air, containing solvents, subsequently flows into the gas burner 42 at the temperature which is achieved in the heat exchanger 32. In the case of the present exemplary embodiment, the burner air reaches the gas burner 42 at a temperature of approximately 200° C. In the heat exchanger 32, the primary gas of the gas burner 42 therefore heats both circulating air, which is fed again to the associated tunnel section T in a cycle via the air inlet 38, and exhaust air which is fed to the gas burner 42 as burner air.

The hot flue gases of the gas burner 42, after passing through the heat exchanger 32, are discharged through the roof via an exhaust gas line 66 which as a collecting line can be connected to the lines 64 of all existing heater units 20.

Figure 2:
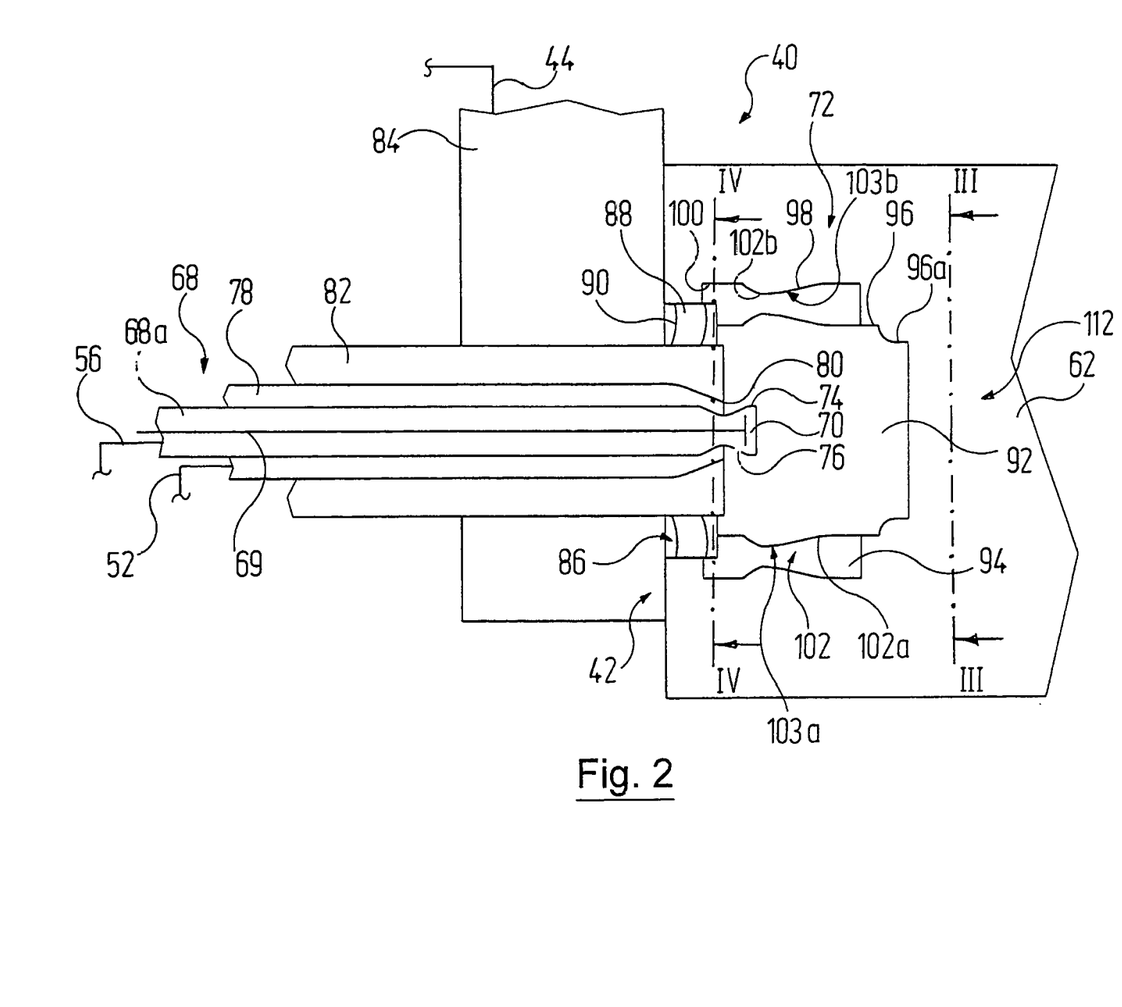
FIG. 2 shows a schematic longitudinal section of a heater unit according to a first exemplary embodiment.
Figure 3:
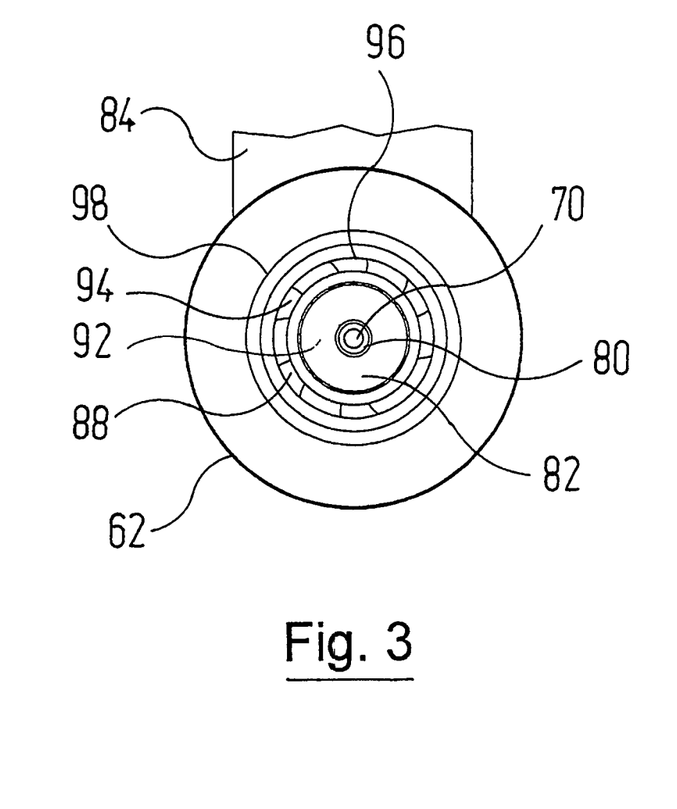
FIG. 3 shows a section of the heater unit of FIG. 2 along the section line III-III there.
Figure 4:
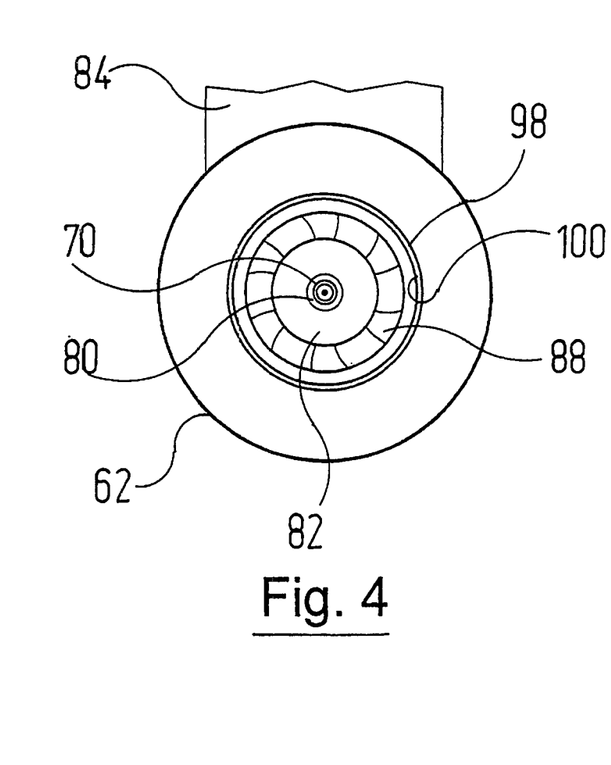
FIG. 4 shows a section of the heater unit of FIG. 2 along the section line IV-IV.

The air and gas routing of a gas burner 42 according to a first exemplary embodiment is illustrated schematically in FIGS. 2, 3 and 4. There, designated 68, is a gas nozzle which has an inner passage 68*a* to which is fed auxiliary air via the auxiliary air line 56 and this is blown into the combustion chamber 62. The gas nozzle 68 is equipped with an ignition plug 69. The inner passage 68*a* of the gas nozzle 68 has an outlet end which in the flow direction of the combustible gas is designed as a diverging outlet cone 70 which projects into a mixing zone 72 of the combustion chamber 62 of the gas burner 42. The outlet cone 70 has a cone wall 74 which has a through-opening 76.

The gas nozzle 68 is coaxially encompassed by an annular passage 78 for combustible gas from the combustible gas line 52, which annular passage terminates in an annular opening 80 at the base of the outlet cone 70 of the gas nozzle 68.

A monitoring chamber 82 for the monitoring device 58 in its turn, as an annulus, coaxially encompasses the annular passage 78 and is open toward the mixing zone 72 so that the IR or UV sensor 60 can record the proportions in the mixing zone 72.

The burner air initially makes its way via the burner air line 44 into a combustion chamber pre-chamber 84 from where it flows via a swirler device 86 into the mixing zone 72 of the gas burner 42, which mixing zone encompasses the outlet cone 70 of the gas nozzle 68. By means of the swirler device 86, the burner air is made to swirl before entry into the mixing zone 72, as a result of which vortices and turbulences are created in a targeted manner in order to promote the intermixing of the burner air and the combustible gas. To this end, the swirler device 86 is designed as a vane ring 88 which coaxially encompasses the gas nozzle 68 in the flow direction upstream of the outlet cone 70. The vane ring 88 comprises vane elements 90 or blade elements by means of which the burner air is made to swirl when flowing through the vane ring 88. In practice, the vane elements 90 are oriented in such a way that the burner air leaves the vane ring 88 with a swirl angle of 45°.

The mixing zone 72 comprises a core region 92 coaxially to the gas nozzle 68 and a throughflow chamber in the form of an annulus 94, coaxially encompassing this core region 92, for which an inner annular wall 96 and an outer annular wall 98 are provided in the mixing zone 72. By means of the inner annular wall 96, the burner air, which is made to flow through the vane ring 88, is divided. The inner annular wall 96 therefore defines a device by means of which the burner air is divided into primary air and secondary air. A portion of the burner air therefore makes its way as primary air into the core region 92 where it is mixed directly with the combustible gas, forming a primary air/combustible gas mixture. The other portion flows as secondary air into the annulus 94 of the mixing zone 72. In this case, the sizes and dimensions of the involved components are such that the ratio of primary air to secondary air lies between 1:3 and 3:1.

The primary air/combustible gas mixture is directed into the combustion chamber 62 where flue gases are produced in a combustion process.

The inner annular wall 96 which delimits the core region 92 extends at the end which is remote from the gas nozzle 68 further into the combustion chamber 62 than the outer annular wall 98 so that an annular section 96*a* of the inner annular wall 96 projects beyond the outer annular wall 98 there.

This annular section 96*a* has a radially inwardly directed annular shoulder, as a result of which the passage cross section of the core region 92 at the outlet end which is defined by the annular section 96*a* is reduced with regard to the average cross section of the core region 92 in its remaining region.

The annulus 94, moreover, is connected via an annular gap 100 to the combustion chamber 62 of the gas burner 42 and consequently provides a flue gas recirculation arrangement. As shown in FIG. 2, the inner annular wall 96 and the outer annular wall 98, in the flow direction of the burner air, have such a geometry that between these is formed a Venturi annular nozzle 102 with a first inner generated surface 102*a*, lying radially on the inside, along the inner annular wall 96 and with a second inner generated surface 102*b*, lying radially on the outside. In this way, in the case of the present exemplary embodiment a flue gas recirculation arrangement according to the Venture principle is provided overall by means of the annulus 94. As a result of the flowing secondary air, a suction effect is achieved at the annular gap 100, by means of which flue gas is sucked from the combustion chamber 62 of the gas burner 42 into the annulus 94 where the flue gas mixes with the secondary air coming from the vane ring 88.

The inner generated surfaces of the annulus 94 form in each case a Coanda profile 103*a*, 103*b* in the flow direction so that the flow of the secondary air or of the secondary air/flue gas mixture follows the course of the Coanda profiles 103*a*, 103*b* in the flow direction on account of the Coanda effect and flows along the inner generated surfaces 102*a*, 102*b*. In this way, a greater negative pressure is created at the annular gap 100 with regard to the velocities of the flows than without this measure. As a result of this, the flue gas is effectively sucked through the annular gap 100 into the Venturi annular nozzle 102 and mixes there in a particularly effective manner with the secondary air.

During operation, the respective flows do not make their way into the combustion chamber 62 one after the other in the flow direction. Rather, the primary air/combustible gas mixture forms a core flow, which is encompassed by an annular flow, which is formed by the secondary air/flue gas mixture resulting in the Venturi annular nozzle 102.

Figure 5:
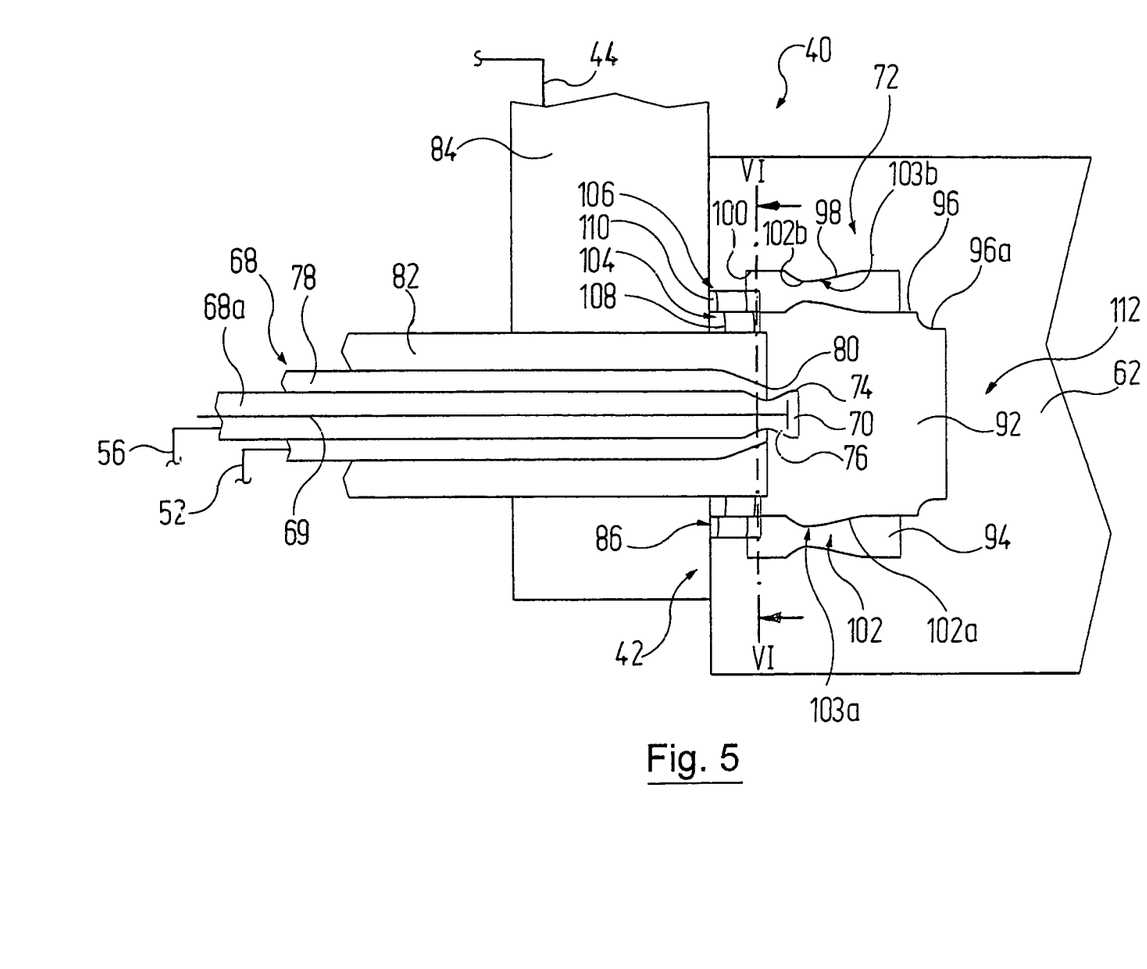
FIG. 5 shows a schematic longitudinal section of a heater unit according to a second exemplary embodiment.
Figure 6:
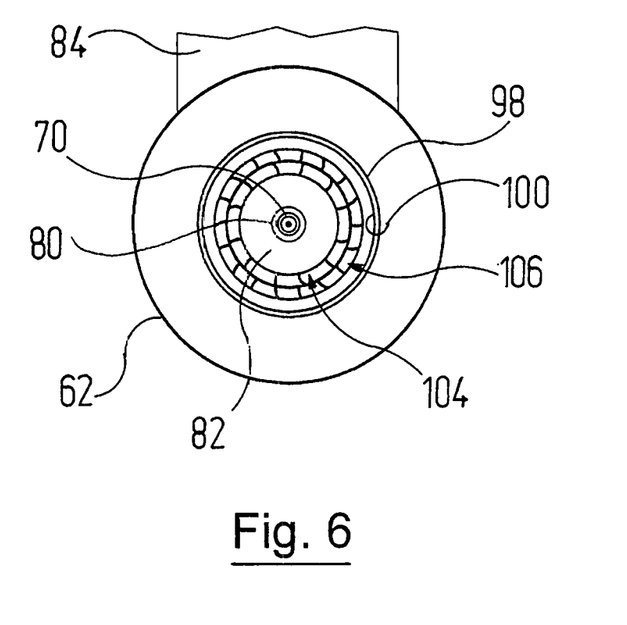
FIG. 6 shows a section of the heater unit of FIG. 5 along the section line VI-VI.

FIGS. 5 and 6 shown a modification to the burner unit 40. There, the swirler device 86 does not comprise one vane ring 88 but comprises a first, inner vane ring 104 and a second, outer vane ring 106 which are arranged coaxially to the gas nozzle 68 and have in each case vane elements 108 and 110.

The vane rings 104, 106 are arranged in such a way that the inner vane ring 104 is connected solely to the core region 92 and the outer vane ring 106 is connected solely to the annulus 94, that is to say fluidically connected to the Venturi annular nozzle 102.

In the case of the present exemplary embodiment, the vane elements 108, 110 of the two vane rings 104, 106 are also oriented so that the burner air leaves the respective vane ring 104, 106 with a swirl angle of 45°. In the case of modifications which are not shown separately the vane elements 108, 110 of the vane rings 104, 106 can also be arranged, however, in angular positions which differ from each other so that the burner air flows into the core region 92 and into the annulus 94 with different swirl angles.

By the extraction of exhaust air from the drying tunnel 14 via the outlet lines 30 and by the division into a useful air flow and a burner air flow, a portion of the air which is recirculated in the drying tunnel 18 is in summary heated to a high degree in the gas burner 42 of the heater unit 20 during the combustion. As a result of this, in the heater unit 20 a neutralization of the enriched pollutants in the exhaust air is already ensured. The gas burner 42 therefore functions as a thermal post-combustion device.

Since the burner air is heated by means of the heat exchanger 32 before reaching the gas burner 42, combustible gas can be saved at the respective gas burner 42.

In the case of the two exemplified gas burners 42 this saving can be up to 12% and in the most favorable case up to 15% with regard to the gas burner, the burner air of which is not heated or heated less intensely. As a result of the hotter burner air, the flame temperature rises, as a result of which the efficiency of the gas burner 42 is improved.

This is indeed at the cost of higher values in the case of nitrogen oxides NOx. In the gas burner 42, however, by the division of the mixing zone 72 into the core region 92 and the annulus 94 with the flue gas recirculation arrangement, a considerable reduction of the nitrogen oxides NOx is achieved. The oxygen content in the secondary air/flue gas mixture, which is created in the annulus 94, is lower than the oxygen content of the secondary air prior to the intermixing. As a result of the flue gas recirculation through the annular gap 100, the secondary air is also heated and the recirculated flue gas is cooled; the secondary air/flue gas mixture has a corresponding average temperature.

The combustion in the core region 92 is initially carried out sub-stoichiometrically so that for example not all the initially created carbon monoxide CO is oxidized by oxygen $O_2$ which is supplied by the primary air, forming $CO_2$, and carbon monoxide CO is still contained in the flue gases which are produced.

The secondary air/flue gas mixture with a reduced oxygen content, after flowing through the annulus 94 at high flow velocity, makes its way downstream of the annular walls 96 and 98 into an ignition zone 112 of the combustion chamber 62 there where it mixes with the flue gases which are produced in the core region 92 from primary air and combustible gas.

The resulting gas mixture only ignites in this ignition zone 112 on account of the high flow velocities of the gas mixtures from the core region 92 and from the annulus 94. The flow velocity of the burner air from the burner air line 44 can be additionally adjusted by means of the feed blower 28.

As a result of the integrated flue gas recirculation arrangement through the annular gap 100 and the simultaneous throughflow of the gas burner 42 by primary air and secondary air/flue gas, a velocity of the secondary air/flue gas mixture at low burner output is already achieved, by means of which a flameless operation of the gas burner 42 is achieved. This flameless operation can be maintained both in an oxidizing and in a reducing atmosphere.

When the gas burner 42 is put into operation, first of all the auxiliary air flow from the auxiliary air line 56 and the combustible gas flow from the combustible gas line 52 are activated. Combustible gas from the annular passage 78 makes its way through the through-opening 76 of the outlet cone 70 to the ignition plug 69 where it mixes with the auxiliary air. The ignition plug 69 is activated and the gas mixture ignites.

The burner air flow from the burner air line 44 is adjusted with the aid of the feed blower 28 and the valve 44 of the splitter device 34. With the initial flow velocities, a highly turbulent flame is first of all created. During the further course of operation, the flow velocity through the flue gas recirculation arrangement via the swirler device 86 increases until ignition of the flame in the ignition zone 112 is carried out; the gas burner 42 then operates in a flameless manner.

In the described concept, the burner air does not flow directly into the combustion chamber 62; the burner air line 44 or the combustion pre-chamber 84 is not connected directly to the combustion chamber 62. As a result of this, a noise reduction in comparison to a direct feed of the combustion chamber 62 with burner air results overall, as is known in the prior art.

The secondary air/flue gas mixture serves as an oxygen supplier for the still present carbon monoxide CO which is now completely oxidized, forming $CO_2$, at relatively low temperature, wherein only low quantities of nitrogen monoxide NO are produced so that consequently only little nitrogen oxide NOx is also created.

Overall, in the case of this burner design outstanding values in carbon monoxide CO and nitrogen oxides NOx with an oxygen proportion of 2.5% to 3% at most are achieved. The values of the nitrogen oxides NOX can be less than 50 $mg/m^3$ in this case and CO values of less than 8 $mg/m^3$ with 2.5% to 3% oxygen $O_2$ can be achieved.

The burner unit 40 follows a rich-lean combustible gas mixing concept in which the ignition zone 112 of the combustion chamber 62 defines a rich region of the combustion chamber 62 and the core region 92 of the mixing zone 72 and also the Venturi annular nozzle 102 define a lean region of the combustion chamber 62.

In the rich region, i.e. in the ignition zone 112, the gas mixture is brought to a combustion air ratio $\lambda$ of 0.3 to 0.8. The burner air, i.e. now the primary air in this case, as explained above, is made to swirl by means of the swirler device 86 and the combustible gas is fed through the gas nozzle 68.

In the lean region, i.e. in the core region 92, the mixture of primary air and combustible gas is ignited and flash expanded on account of the intermixing which is optimized by means of the swirler device 86. Therefore, components containing nitrogen reside only very briefly in the core region 92.

The required, still cold, secondary air, also made to swirl by means of the swirler device 86, flows into the Venturi annular nozzle 102 where it mixes with the oxygen-impoverished flue gas from the combustion chamber 62. The resulting secondary air/flue gas mixture is depleted compared with the pure burner air and contains less oxygen than the burner air. Moreover, the resulting secondary air/flue gas mixture is colder than the flue gas.

In the ignition zone 112, the core flow consisting of the primary air/combustible gas mixture and the annular flow consisting of the secondary air/flue gas mixture now come together where the highly active, expanding primary air/combustible gas mixture reacts with the encompassing annular flow, wherein the reaction proceeds in an effective manner and the gases at high velocity and without local ignition centers, i.e. without so-called "hot spots", are distributed in the combustion chamber 62.

The oxidation processes of the core flow, consisting of the primary air/combustible gas mixture, and of the annular flow, consisting of the secondary air/flue gas mixture, combine in a known manner so that the reactions in the overall combustion chamber 62 take place largely at the same time. Other than in the case of known burner units, there are no, or almost no, air-combustible gas limits which influence the effectiveness and the emissions values.

Due to the resulting simultaneous distribution of the reaction process inside the combustion chamber 62, the combustion is carried out without a discernibly visible flame. In practice, in the combustion chamber 62 only a luminescence of greater or less brightness, which is dependent upon the burner output, without the mentioned "hot spots" are to be seen.

Since a proportion of the exhaust air extracted from the drying tunnel 18 is used as combustion air for the gas burner 42, the proportion of the tunnel air which has to be conducted as exhaust air to the superordinated post-combustion device, which is mentioned in the introduction, is reduced by the corresponding proportion. As a result of this, the contribution to the post-combustion becomes less and the gas consumption for the post-combustion device can be lowered overall.

Overall, the proportion of exhaust gases, which is discharged to atmosphere through the roof, is also reduced.

The burner unit 40 described above can also be used independently as a stand-alone burner unit and therefore as an energy source without the exhaust air or the like being combusted by it. In this, no exhaust air or the like, but fresh air, is fed to the burner unit 40 via the burner air line 44.

What is claimed is:

1. A burner unit for combusting exhaust air, comprising:
    a) a combustion chamber, in which flue gases are produced;
    b) a gas burner, to which combustible gas can be fed via a combustible gas line and to which burner air, including exhaust air serving as burner air, can be fed via a burner air line;
    c) a first device, by means of which the burner air is divided into primary air and secondary air;
    d) a mixing zone, in which the primary air is mixed with the combustible gas, forming a primary air/combustible gas mixture, wherein the primary air/combustible gas mixture is fed to the combustion chamber;
    e) a flue gas recirculation arrangement, which comprises a throughflow chamber designed as an annulus which forms a Venturi annular nozzle which is connected to the combustion chamber, and in which the secondary air is mixed with flue gases which are produced in the combustion chamber, forming a secondary air/flue gas mixture;
    f) a second device comprising the Venturi annular nozzle, by means of which the secondary air/flue gas mixture is added to the primary air/combustible gas mixture in the combustion chamber;
   wherein
    g) at least one inner generated surface of the throughflow chamber forms a Coanda profile in the flow direction.

2. The burner unit as claimed in claim 1, wherein the annulus encompasses a core region of the mixing zone of the combustion chamber, wherein the primary air is mixed with the combustible gas in the core region.

3. The burner unit as claimed in claim 2, wherein the device by means of which the burner air is divided into primary air and secondary air is formed by the radially annular inner wall of the annulus.

4. The burner unit as claimed in claim 2, wherein provision is made for a swirler device by means of which primary air can be made to swirl before entry into the core region and/or by means of which secondary air can be made to swirl before entry into the annulus.

5. The burner unit as claimed in claim 4, wherein the swirler device is designed as a vane ring.

6. The burner unit as claimed in claim 5, wherein the vane ring connects the burner air line to the annulus and to the core region of the mixing zone.

7. A device for the temperature control of objects, especially for drying coated vehicle bodies, comprising:
    a) a temperature control tunnel, which is accommodated in a housing and defines at least one tunnel section which comprises at least one air outlet and at least one air inlet;
   wherein
    b) a heater unit is associated with the tunnel section, in which heater unit a hot primary gas can be created by means of a burner unit;
   wherein
    the burner unit is a burner unit as claimed in claim 1.

* * * * *